United States Patent
Oesterling et al.

(10) Patent No.: US 7,286,045 B2
(45) Date of Patent: Oct. 23, 2007

(54) METHOD FOR IDENTIFYING VEHICLES

(75) Inventors: Christopher L. Oesterling, Troy, MI (US); Andrea K. Suurmeyer, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 64 days.

(21) Appl. No.: 10/911,149

(22) Filed: Aug. 3, 2004

(65) Prior Publication Data

US 2006/0028324 A1    Feb. 9, 2006

(51) Int. Cl.
    *B60R 25/10* (2006.01)
(52) U.S. Cl. ............... 340/426.22; 340/426.18; 340/426.19; 342/357.07; 455/456.2
(58) Field of Classification Search ......... 340/426.1, 340/426.18, 426.19, 426.2, 426.21, 426.22, 340/426.23; 307/10.2; 701/207, 213; 455/456.2; 342/357.07
    See application file for complete search history.

(56) References Cited

U.S. PATENT DOCUMENTS

| 4,768,027 | A   | * | 8/1988  | Benjamin et al. | ...... 340/426.23 |
| 4,970,389 | A   | * | 11/1990 | Danforth et al. | ............ 250/271 |
| 5,003,317 | A   | * | 3/1991  | Gray et al.     | ................. 342/457 |
| 5,900,823 | A   | * | 5/1999  | Coll-Cuchi      | ................ 340/5.64 |
| 6,313,740 | B1  | * | 11/2001 | Goetz           | ..................... 340/426.23 |
| 6,868,313 | B2  | * | 3/2005  | Koljonen        | ....................... 701/1 |
| 6,922,137 | B1  | * | 7/2005  | Bycroft         | ................... 340/425.5 |
| 2002/0044069 | A1 | * | 4/2002 | Jenkinson       | ................... 340/928 |
| 2002/0097168 | A1 | * | 7/2002 | Mitchell et al. | ............ 340/945 |
| 2002/0195490 | A1 | * | 12/2002 | Gehlot et al.  | ............... 235/384 |
| 2002/0198653 | A1 | * | 12/2002 | Lutter          | ....................... 701/209 |

* cited by examiner

*Primary Examiner*—Brent A. Swarthout

(57) ABSTRACT

A method for identifying a vehicle includes receiving a stolen vehicle input at a call center and receiving a confirmation input at a call center. A vehicle code display command is sent from the call center to a telematics unit of the stolen vehicle and a vehicle code of the stolen vehicle is displayed in the stolen vehicle.

14 Claims, 2 Drawing Sheets

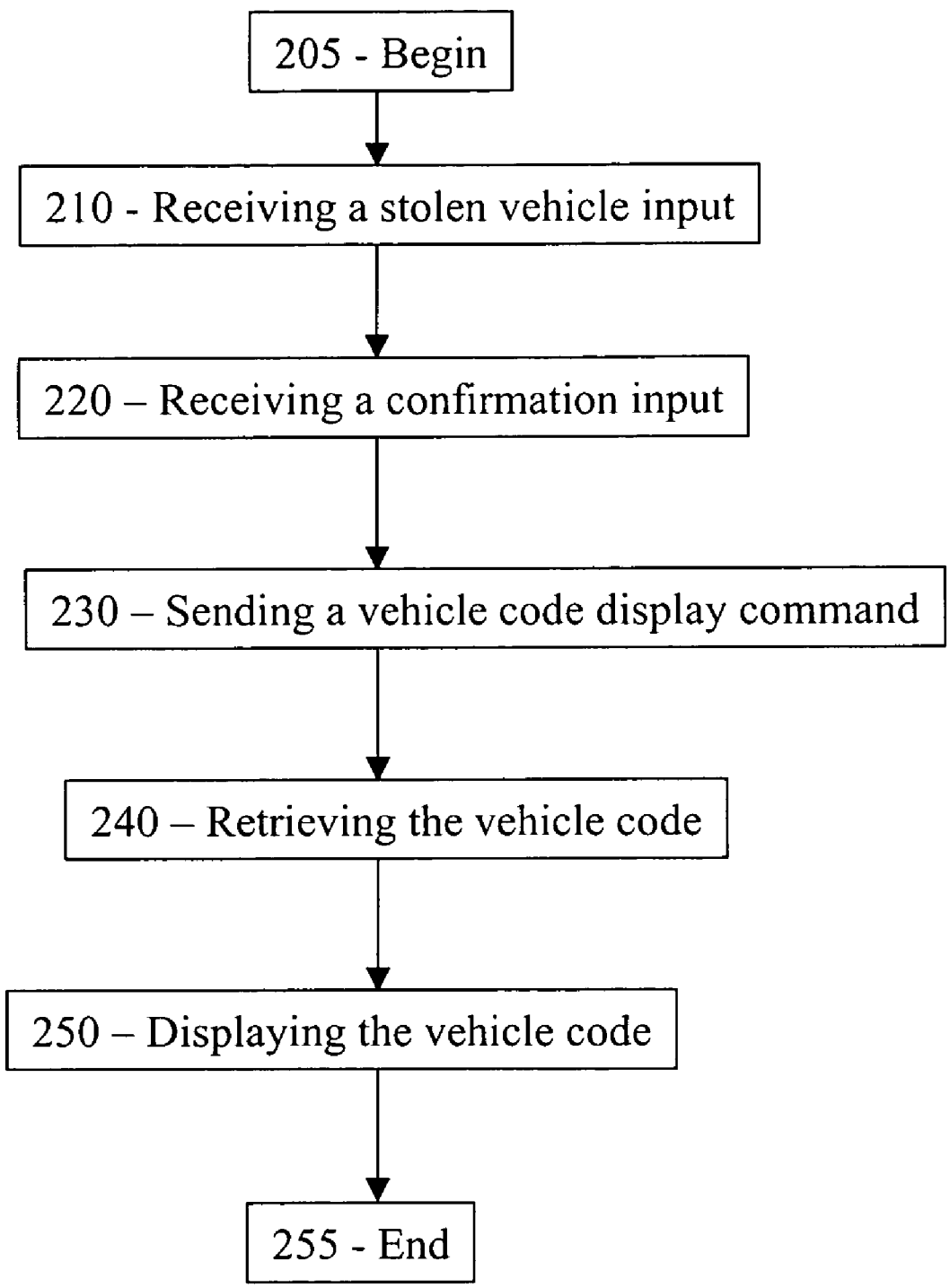
FIG. 2    200

METHOD FOR IDENTIFYING VEHICLES

FIELD OF THE INVENTION

This invention relates generally to methods of identifying vehicles.

BACKGROUND OF THE INVENTION

Vehicle theft is a serious crime. Commercial services have arisen to assist in tracking stolen vehicles using wireless communication services and GPS technology. However, sophisticated vehicle thieves know of these counter measures, and some thieves modify the VIN (Vehicle Identification Number) on the vehicle. The modified VIN number is sometimes fabricated, sometimes copied from a new vehicle lot, and the VIN plates and stickers are changed to reflect a VIN different than the original, factory-established VIN. Thus, if law enforcement officials are directed to the location of a vehicle that is reportedly stolen, but the VIN appears different than the stolen VIN, the officials may become confused and even misled by the discrepancy.

It is therefore desirable to provide a method for identifying vehicles that overcomes the limitations, challenges, and obstacles described above.

SUMMARY OF THE INVENTION

One aspect of the present invention provides a method for identifying a vehicle. The method includes receiving a stolen vehicle input at a call center and receiving a confirmation input at a call center. The method further includes sending a vehicle code display command from the call center to a telematics unit of the stolen vehicle and displaying a vehicle code of the stolen vehicle in the stolen vehicle.

Another aspect of the invention provides a computer readable medium storing a computer program for identifying a vehicle. The medium includes computer readable code for receiving a stolen vehicle input at a call center and computer readable code for receiving a confirmation input at a call center. The medium further includes computer readable code for sending a vehicle code display command from the call center to a telematics unit of the stolen vehicle and computer readable code for displaying a vehicle code of the stolen vehicle in the stolen vehicle.

A third aspect of the invention provides a system for identifying a vehicle. The system includes means for receiving a stolen vehicle input at a call center and means for receiving a confirmation input at a call center. The system further includes means for sending a vehicle code display command from the call center to a telematics unit of the stolen vehicle and means for displaying a vehicle code of the stolen vehicle in the stolen vehicle.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flowchart representative of one embodiment of a method for identifying vehicles in accordance with the present invention; and

DETAILED DESCRIPTION OF THE PRESENTLY PREFERRED EMBODIMENTS

Figure 1:
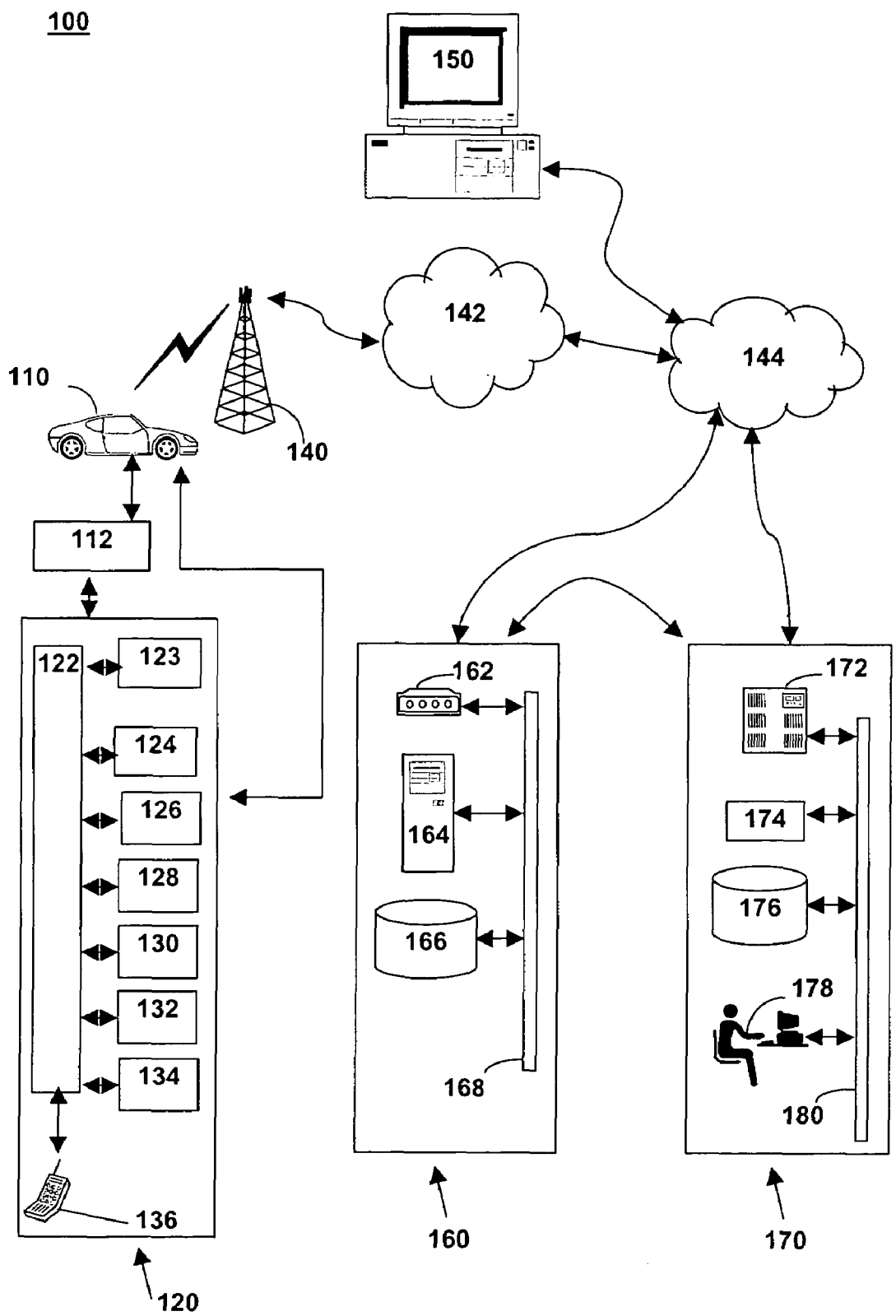
FIG. 1 is a schematic diagram of one embodiment of a system for identifying vehicles in accordance with the present invention.

FIG. 1 illustrates one embodiment of a system for identifying vehicles in accordance with the present invention at 100. System 100 includes a mobile vehicle communication unit (MVCU) 110; a vehicle communication network 112; a telematics unit 120; one or more wireless carrier systems 140; one or more communication networks 142; one or more land networks 144; one or more client, personal, or user computers 150; one or more web-hosting portals 160; and one or more call centers 170. In one embodiment, MVCU 110 is implemented as a mobile vehicle equipped with suitable hardware and software for transmitting and receiving voice and data communications. In an example, a display is embedded in MVCU 110. The display is a dialed digital display such as a radio unit, radio head or an instrument panel. MVCS 100 may include additional components not relevant to the present discussion.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to an in-vehicle audio speech-generating source 123, a wireless modem 124, a global positioning system (GPS) unit 126, an in-vehicle memory 128, a microphone 130, one or more speakers 132, dialed digital display 134, and an embedded or in-vehicle mobile phone 136. In other embodiments, telematics unit 120 may be implemented without one or more of the above listed components such as, for example, speakers 132. Telematics unit 120 may include additional components not relevant to the present discussion. In one embodiment, dialed digital display 134 is in communication with a radio tuner. In one embodiment, dialed digital display 134 is a driver information center display. Driver information center displays include analog and/or digital displays to communicate information to a driver, including, for example, speed, distance, time, gas levels etc. Driver information center displays are installed in a driver's field of vision, such as on a dashboard or on a heads-up display.

In one embodiment, processor 122 is implemented as a microcontroller, microprocessor, controller, host processor, or vehicle communications processor. In an example, processor 122 is implemented as an application-specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 136 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, satellite uplink facility 165, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 can reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends data transmissions to or receives data transmissions from one or more databases 166 via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170 and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends data transmissions to or receives data transmissions from one or more communication services databases 176 via network system 180. Communication services manager 174 sends data transmissions to or receives data transmissions from one or more communication services advisors 178 via network system 180. Communication services database 176 sends data transmissions to or receives data transmissions from communication services advisor 178 via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144, and web-hosting portals 160 using voice transmissions. In an alternative embodiment, communication services manager 174 communicates with telematics unit 120 in MVCU 110 through wireless carrier system 140, communication network 142, land network 144, and web hosting portals 160 using voice transmissions. Switch 172 selects between voice transmissions and data transmissions.

FIG. 2 illustrates a flowchart 200 representative of one embodiment of a method for locating a vehicle. The term "stolen vehicle" as used herein is defined broadly as any vehicle whose location is not known to the legal owner of the vehicle, or any vehicle whose location has been obfuscated by the legal owner of the vehicle. "Vehicle" is any vehicle, such as MVCU 110 as described above. Method 200 begins at 205.

At step 210, at least one stolen vehicle input is received. In one embodiment, the stolen vehicle input is received at a call center, such as, for example, call center 170 described above. The stolen vehicle input results from, for example, communications from the owner of the vehicle, another interested party such as an insurance company, or the police or other authority. The stolen vehicle input, in one embodiment, is added to a database of stolen vehicle inputs maintained, for example, at or in communication with, the call center. In one embodiment each stolen vehicle input is associated with one vehicle.

At step 220, a confirmation input is received. In one embodiment, the confirmation input is received at the call center. In another embodiment, the confirmation input is received at the telematics unit. In yet another embodiment, the confirmation input is received at the telematics unit and then transmitted to the call center using a wireless communication network. A confirmation input includes any communication indicating that a person wishing to verify the identity of a vehicle is prepared to confirm the vehicle identity.

For example, the call center may successfully direct a police officer to the location of a stolen vehicle. Upon arrival at the vehicle, the police officer desires to confirm the identify of the vehicle, and contacts the call center to obtain such confirmation. The police officer is then able to provide a confirmation input to either the telematics unit or the call center.

At step 230, a vehicle code display command is sent from the call center to the telematics unit of the stolen vehicle. A vehicle code display command is any instruction to display a vehicle code. A vehicle code, as defined herein, is any unique number assigned to a vehicle. In one embodiment, the vehicle code is the VIN that is assigned to each vehicle upon its manufacture. In another embodiment, the vehicle code is any unique identifier assigned to the vehicle. The unique code may be assigned during the manufacture of the vehicle, or at another time during the lifespan of the vehicle, such as with an after-market manufacturer.

At step 240, the vehicle code is retrieved. In one embodiment, the vehicle code is retrieved from ROM in communication with the telematics unit. In one embodiment, the ROM is in-vehicle memory 128. In one embodiment, the vehicle code is written to ROM during manufacture. In another example, the vehicle code is retrieved from the call center over a wireless network.

At step 250, the vehicle code is displayed in the stolen vehicle. In one embodiment, displaying the vehicle code comprises displaying the vehicle code on a display screen. In one embodiment, the display screen is a dialed digital display. In one embodiment, the dialed digital display is a driver information center display. In another embodiment, the dialed digital display is a radio tuner. In another embodiment, the code is displayed audibly. In one embodiment, the code is broadcast over a speaker, such as speaker 132. In another embodiment, the speaker is an in-vehicle audio speech-generating source, such as in-vehicle audio speech-generating source 123.

At step 255, method 200 ends.

In one embodiment, a user initiates a vehicle code check to determine the VIN of a desired vehicle by providing a confirmation input to the telematics unit, and requesting the VIN by either orally requesting the same, or with another form of input such as a button push. In response to the vehicle code check, the vehicle code is provided to the user. The vehicle code may be provided to the user with the radio display or on the driver information center. In another embodiment, an advisor at the call center provides the vehicle code to the user either visually (i.e. on the radio display or driver information center) or orally over the speakers.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for identifying a vehicle, comprising the steps of:
   receiving into a telematics unit of the vehicle a confirmation input that is entered into the telematics unit by a person located at the vehicle, wherein the confirmation input is a request by the person to verify the identity of the vehicle;
   transmitting the confirmation input from the vehicle telematics unit to a call center;
   sending a vehicle code display command from the call center to the vehicle telematics unit in response to the confirmation input;
   retrieving a vehicle code; and
   providing the vehicle code to the person by displaying the vehicle code inside the vehicle in response to the vehicle code display command.

2. The method of claim 1, wherein the retrieving step further comprises retrieving the vehicle code from a memory located on the vehicle.

3. The method of claim 1, wherein the sending and retrieving steps further comprise retrieving the vehicle code from the call center and sending the vehicle code and vehicle code display command to the vehicle telematics unit.

4. The method of claim 1, wherein the vehicle code is a vehicle identification number.

5. The method of claim 1, wherein the step of displaying the vehicle code further comprises displaying the vehicle code on a display screen.

6. The method of claim 5, wherein the display screen is a driver information center display.

7. The method of claim 1, wherein the step of displaying the vehicle code further comprises audibly presenting the vehicle code inside the vehicle using a speaker.

8. The method of claim 7, wherein the vehicle code is audibly presented using an in-vehicle audio-speech-generating source.

9. The method of claim 1, wherein the receiving step further comprises receiving the confirmation input into the telematics unit using either a button push or oral request by the person at the vehicle.

10. A method for identifying a vehicle, comprising the steps of:
    receiving a user request directly entered by a person into a telematics unit in the vehicle so as to initiate a vehicle code check to electronically obtain a vehicle identification number assigned to the vehicle;
    transmitting a confirmation input from a vehicle telematics unit to a call center in response to the request;
    sending a vehicle code display command from the call center to the vehicle telematics unit;
    retrieving the vehicle identification number assigned to the vehicle; and
    in response to receiving the vehicle code display command, providing the vehicle code to the person by displaying the vehicle identification number on a driver information display inside the vehicle.

11. The method of claim 10, wherein the transmitting step further comprises transmitting the confirmation input from the vehicle telematics unit to the call center over a wireless communication network.

12. The method of claim 10, wherein the retrieving step further comprises retrieving the vehicle identification number from an in-vehicle memory.

13. The method of claim 10, wherein the retrieving step further comprises retrieving the vehicle identification number from the call center.

14. The method of claim 13, wherein the vehicle identification number is sent from the call center to the vehicle telematics unit over a wireless communication network.

* * * * *